US009739265B2

(12) United States Patent
Betran Palomas

(10) Patent No.: US 9,739,265 B2
(45) Date of Patent: Aug. 22, 2017

(54) METHOD OF OPERATING A WIND TURBINE

(71) Applicant: ALSTOM RENEWABLE TECHNOLOGIES, Grenoble (FR)

(72) Inventor: Jaume Betran Palomas, Sant Cugat del Vallès (ES)

(73) Assignee: ALSTOM Renewable Technologies, Grenoble (FR)

( * ) Notice: Subject to any disclaimer, the term of this patent is extended or adjusted under 35 U.S.C. 154(b) by 423 days.

(21) Appl. No.: 14/377,116

(22) PCT Filed: Feb. 28, 2013

(86) PCT No.: PCT/EP2013/053996
§ 371 (c)(1),
(2) Date: Aug. 6, 2014

(87) PCT Pub. No.: WO2013/127899
PCT Pub. Date: Sep. 6, 2013

(65) Prior Publication Data
US 2015/0030449 A1    Jan. 29, 2015

Related U.S. Application Data

(60) Provisional application No. 61/640,818, filed on May 1, 2012.

(30) Foreign Application Priority Data

Mar. 1, 2012    (EP) ..................................... 12382077

(51) Int. Cl.
*F03D 7/02*    (2006.01)

(52) U.S. Cl.
CPC ......... *F03D 7/0224* (2013.01); *F03D 7/0232* (2013.01); *F05B 2260/76* (2013.01);
(Continued)

(58) Field of Classification Search
CPC ...... F03D 7/0232; F03D 7/0224; F03D 7/022; F03D 7/024
See application file for complete search history.

(56) References Cited

U.S. PATENT DOCUMENTS

2011/0193344 A1* 8/2011 Lafferty .................. F03D 7/047
290/44
2012/0056426 A1* 3/2012 Van Kuik ............. F03D 7/0224
290/44

FOREIGN PATENT DOCUMENTS

EP    2 019 203    1/2009
ES    WO 2010130721 A1 * 11/2010    ........... F03D 7/0224
(Continued)

*Primary Examiner* — Richard Edgar
(74) *Attorney, Agent, or Firm* — Dority & Manning, P.A.

(57) ABSTRACT

Method of operating a wind turbine comprising a plurality of blades rotatable along their longitudinal axes using a pitch mechanism, and comprising one or more movable trailing edge surfaces. The method includes predicting, at a first moment in time, a high load for one or more of the blades at a second moment in time. The method further comprises actuating on one or more of the movable trailing edge surfaces of these blades such that the trailing edge surfaces have a wider range of control to counteract the predicted high loads before the second moment in time, and simultaneously pitching the blades such as not to negatively affect the operation of the wind turbine. The method furthermore comprises, at the second moment in time, actuating the one or more movable trailing edge surfaces of the at least one or more blades to counteract the high loads.

19 Claims, 8 Drawing Sheets

(52) U.S. Cl.
CPC ..... *F05B 2270/32* (2013.01); *F05B 2270/322* (2013.01); *F05B 2270/328* (2013.01); *F05B 2270/331* (2013.01); *F05B 2270/335* (2013.01); *F05B 2270/404* (2013.01); *F05B 2270/8042* (2013.01); *Y02E 10/723* (2013.01)

(56) References Cited

FOREIGN PATENT DOCUMENTS

| WO | WO 2007/045940 | 4/2007 |
|----|----------------|--------|
| WO | WO 2010/084131 | 7/2010 |

\* cited by examiner

METHOD OF OPERATING A WIND TURBINE

This application claims the benefit of European Patent Application 12382077.1 filed Mar. 1, 2012 and U.S. Provisional Patent Application Ser. No. 61/640,818 filed May 1, 2012.

The present disclosure relates to a method of operating a wind turbine, and more particularly relates to a method of operating a wind turbine that comprises a plurality of blades, each of the blades being rotatable along its longitudinal axis, and each of the blades comprising one or more movable trailing edge surfaces, such as e.g flaps.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A clear trend in the field of wind energy is to increase the size of the wind turbines. Both hub height and blade length have increased dramatically in recent years, and it appears that this trend will continue. With an increase in blade length, blades that are relatively lighter are needed in order to control the Cost of Energy (COE) of the wind turbine.

As blades become lighter, blade loads such as e.g. the blade root bending moment may become more critical. The blade loads may be substantially affected by e.g. wind gusts, turbulence and wind shear. Changing wind velocities, and more particularly quickly changing wind velocities can especially affect the blade loads, and thereby impact the fatigue of various wind turbine components, such as e.g. the blades, hub, rotor shaft or gearbox.

Pitch systems may be employed in wind turbines for adapting the position of a wind turbine blade to varying wind conditions by rotating the blade along its longitudinal axis. In this respect, it is known to rotate a wind turbine blade in such a way that it generates less lift (and drag) when the wind speed increases. This way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance.

A common control strategy of a variable speed wind turbine is to maintain the blade in a predefined "below rated pitch position" at wind speeds equal to or below nominal wind speed (for example from approximately 3 or 4 m/s to 10 m/s). Said default pitch position may generally be close to a 0° pitch angle. The exact pitch angle in "below rated" conditions depends however on the complete design of the wind turbine. In the lower wind speed regions (at "partial load"), the objective is generally to maximize power output by maintaining pitch constant, thereby catching maximum energy, and varying generator torque and the rotor speed to keep the power coefficient, $C_p$, at a maximum. Above the nominal speed (for example from approximately 10 m/s to 25 m/s), the blades are rotated to maintain the aerodynamic torque delivered by the rotor substantially constant. This means that the angle of attach of the blades is generally reduced with increasing wind speed. Cut-in wind speed may e.g be around 3 m/s, nominal wind speed may be e.g. around 10 m/s and cut-out wind speed may e.g. be around 25 m/s. The nominal wind speed, cut-in wind speed and cut-out wind speed may of course vary depending on the wind turbine design.

Furthermore, aerodynamic devices such as e.g. flaps, slats, spoilers, and Boundary Layer Control devices may be employed on blades of wind turbines in order to influence and control the aerodynamic flow around the blades. Flaps along the trailing edge of a blade can be actuated relatively quickly and have the capability of quickly modifying the lift and drag (loads) of a blade. Flaps may therefore be employed on larger wind turbine blades to quickly alleviate loads when needed.

In wind turbines wherein the blades comprise one or more flaps, and wherein the blades may be rotated substantially along their longitudinal axes by a pitch mechanism, a joint control of the various actuators is needed in order to make sure e.g. that loads stay within predefined limits, fatigue is limited and electrical power may be generated efficiently (at a relatively low Cost Of Energy).

SUMMARY

In a first aspect, the present disclosure provides a method of operating a wind turbine comprising a plurality of blades, each of the blades being rotatable along its longitudinal axis using a pitch mechanism, and each of the blades comprising one or more movable trailing edge surfaces. The method comprises, at a first moment in time, predicting a high load for one or more of the blades at a second moment in time. The method further comprises, before the second moment in time, (i.e. before the predicted high load) actuating on one or more of the movable trailing edge surfaces of these blades such that they assume a position wherein they have a wider range of control to counteract the predicted high loads, and simultaneously pitching the blades such as not to negatively affect the operation of the wind turbine. And finally, at the second moment in time, the one or more movable trailing edge surfaces of the at least one or more blades may be actuated to counteract the high loads.

In this first aspect, when a high load is predicted, e.g. one or more flaps along a blade may be moved towards a position in which its control range is increased such that it can counteract the predicted high load when necessary. For example, if a flap is at its most negative position (wherein it reduces the lift of the blade), it may be moved towards its neutral position or even towards its most positive position (wherein it actually increases the lift of the blade). This in itself would lead to e.g. higher lift and higher drag. This may increase e.g. blade root bending moments and the aerodynamic torque of the wind turbine. To at least partially compensate for this modified flap position, a pitch mechanism may be used to reduce the angle of attack of the blades, and thereby reduce the lift (and drag). The combination of both measures will make sure that the operation of the wind turbine does not need to be affected in a substantial manner. And at the same time, it can be ensured that the flaps are in a position in which it can counteract the high loads quickly.

The operational mode of the wind turbine may be to maximize the generation of electrical power. In such cases for example, pitching the blades such as not to negatively affect the operation of the wind turbine may comprise pitching the blades such that the generation of electrical power is not negatively affected.

Pitching the blades such as not to negatively affect the operation of the wind turbine may in certain circumstances also comprise pitching the blades such that the loads on the blades remain substantially at the same level as at the first moment in time.

In some embodiments, high loads may be predicted using a LIDAR system. In further embodiments, a high load may be predicted by measuring the loads in the wind turbine itself or in a neighbouring wind turbine.

In some embodiments, the movable trailing edge surfaces may be flaps. Optionally, each of the blades may comprise a plurality of flaps distributed along the length of the blade, and each of these flaps may be actuated individually. In these embodiments, whenever a local high load is predicted, only the flap in question (i.e. only the flap that will encounter the local high load) may be actuated, and it may not be necessary to move all the flaps to e.g. their neutral position, only the flap that is potentially affected. In these cases, the pitch of the blade may not need to be changed a lot.

In other embodiments, the movable trailing edge surfaces may be Continuously Deformable Trailing Edge (CDTE) portions.

In some embodiments, at a first moment in time, a high load may be predicted for a first blade at a second moment in time, and a high load may be predicted for a second blade at a third moment time. Before said second moment in time, the flaps (or alternative movable trailing edge surface) of the first blade may be actuated such that they assume a position wherein they have a wider range of control to counteract the predicted high loads and before said third moment in time, the flaps (or alternative movable trailing edge surface) of the second blade may be actuated such that they assume a position wherein they have a wider range of control to counteract the predicted high loads.

Simultaneously, the blades of the wind turbine may be pitched such that the operation of the wind turbine (e.g. the generation of electrical power or the loads on the blades) is substantially not negatively affected and at said second moment in time, the one or more flaps of the first blade are actuated so as to counteract the high loads, and at the third moment in time, the one or more flaps of the second blade may be actuated so as to counteract the high loads.

In some embodiments, the wind turbine may comprise a collective pitch mechanism for pitching all the blades together. In other embodiments, the wind turbine may comprise an individual pitch system for each of the blades, such that each of the blades can be pitched individually.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1A:
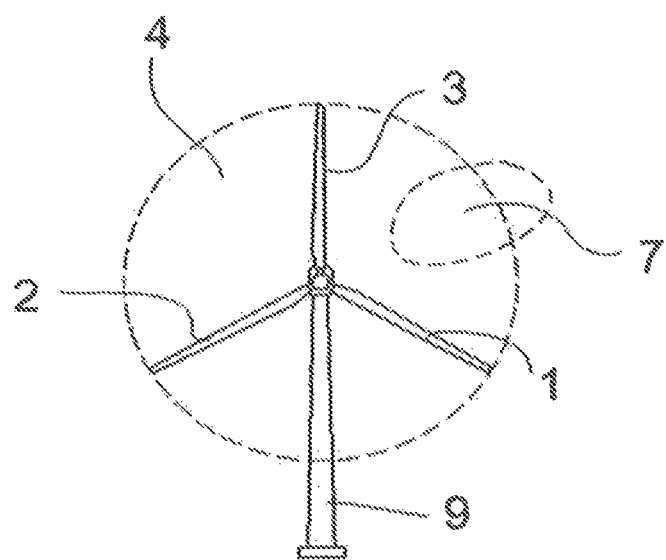
FIG. 1a illustrates a wind turbine.

FIG. 1a illustrates a wind turbine comprising a tower 9, and a rotor comprising a first blade 1, a second blade 2 and a third blade 3. The swept area of the rotor is indicated using reference sign 4. In accordance with embodiments of the invention, each of the blades may be rotated substantially along their longitudinal axes, using a collective pitch mechanism or three individual pitch mechanisms.

Figure 1B:
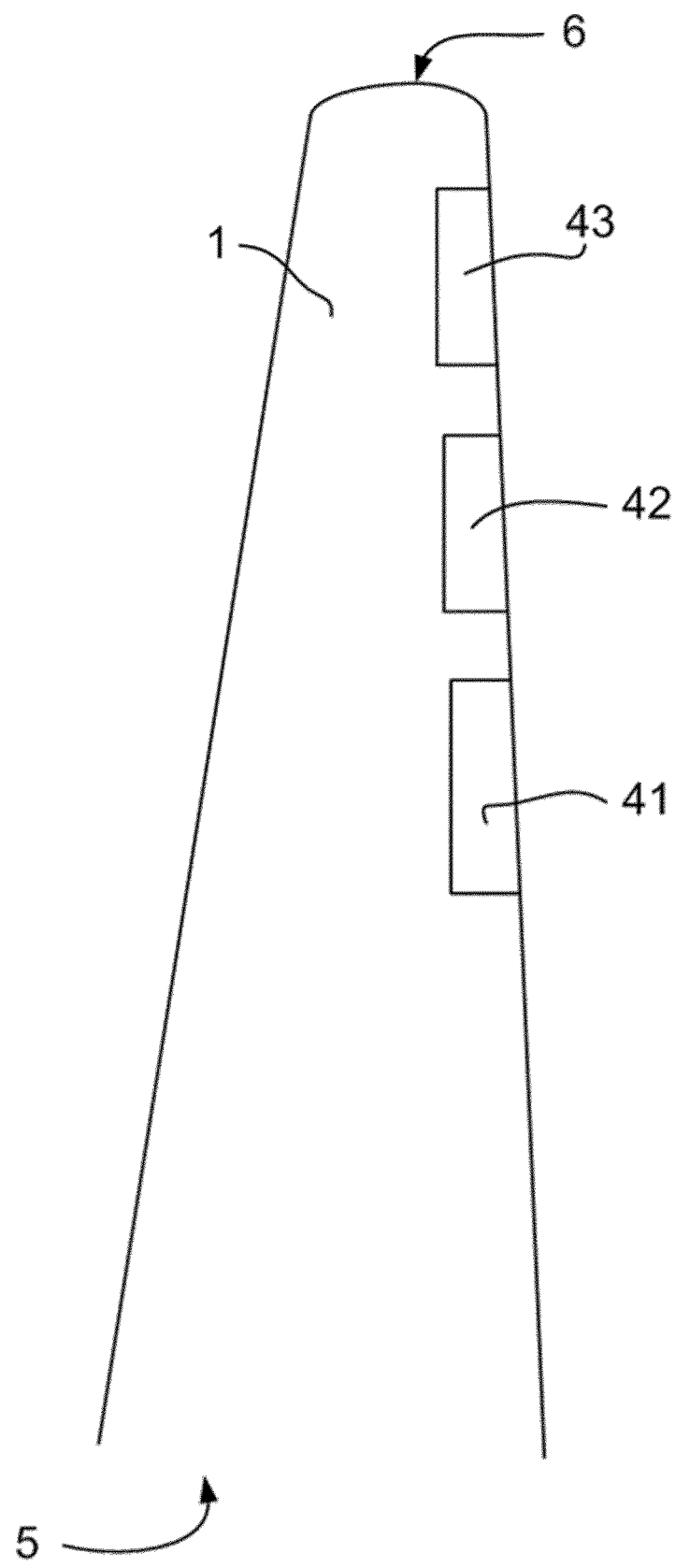
FIG. 1b illustrates a wind turbine blade comprising a plurality of flaps along its span.

FIG. 1b illustrates a top view of a wind turbine blade 1. The wind turbine blade extends from the blade root 5 to a blade tip 6. In the displayed embodiment, three flaps 41, 42, 43 have been provided along the trailing edge, substantially in an outer portion of the blade span. In other embodiments, more or less flaps may be provided. Additionally, in other embodiments, flaps may only be provided along an inner portion of the blade span, or alternatively flaps may be provided substantially along the entire blade span.

Figure 1C:
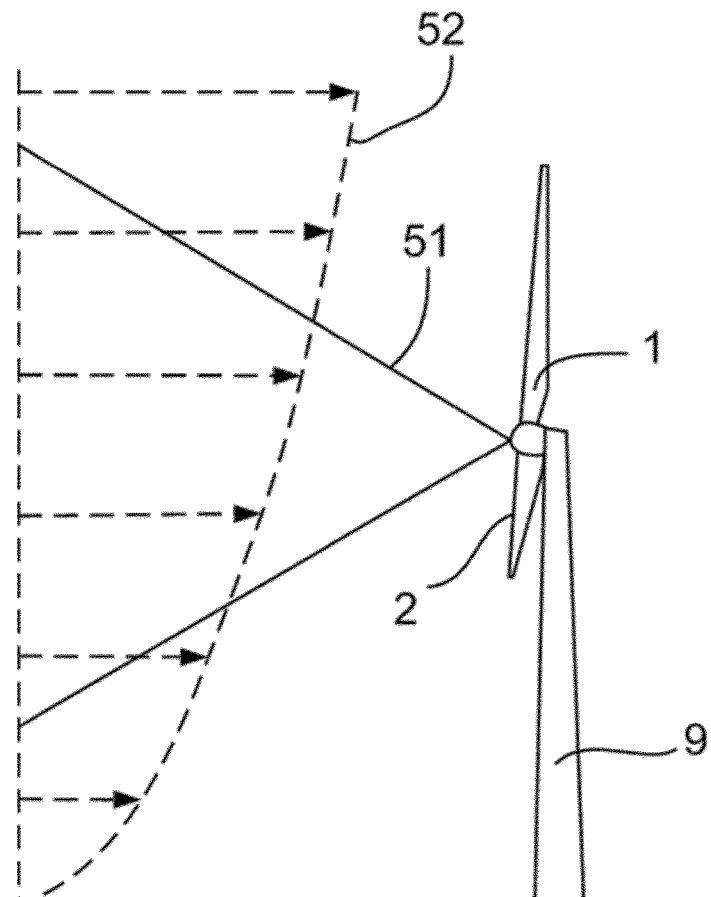
FIG. 1c illustrates a possibility of predicting high loads that may be used in embodiments of the present invention

FIG. 1c illustrates the use of a LIDAR 51 on a wind turbine. LIDAR stands for Light Detection and Ranging and involves an optical remote sensing technology that can measure the distance to, or other properties of a target by illuminating the target with light. LIDARs and specifically Doppler LIDARs are well known in the field of wind energy for measuring wind speeds ahead of a wind turbine and they will not be further described herein. LIDARs may be used to e.g. measure wind speeds, wind shear (as indicated with reference sign 52 in FIG. 1c), and local turbulences, e.g. the area indicated with reference sign 7 in FIG. 1a.

Figure 2A:
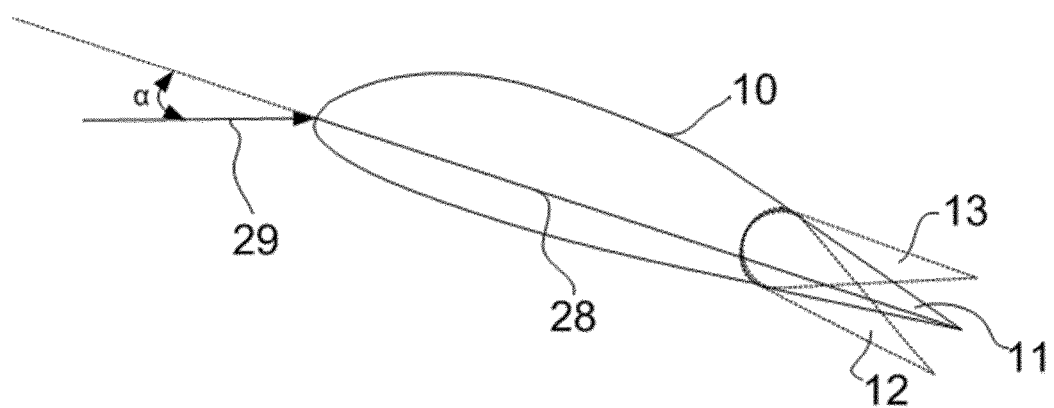
FIGS. 2a-2c illustrate the effect of a flap on the lift coefficient and drag coefficient of an aerodynamic profile for different angles of attack and different flap positions.
Figure 2B:
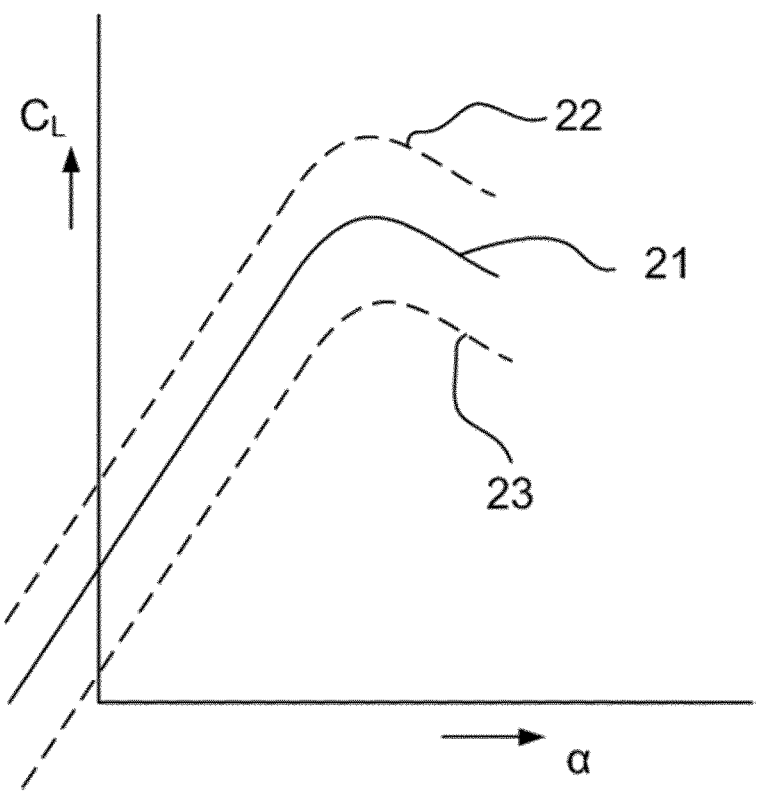
Figure 2C:
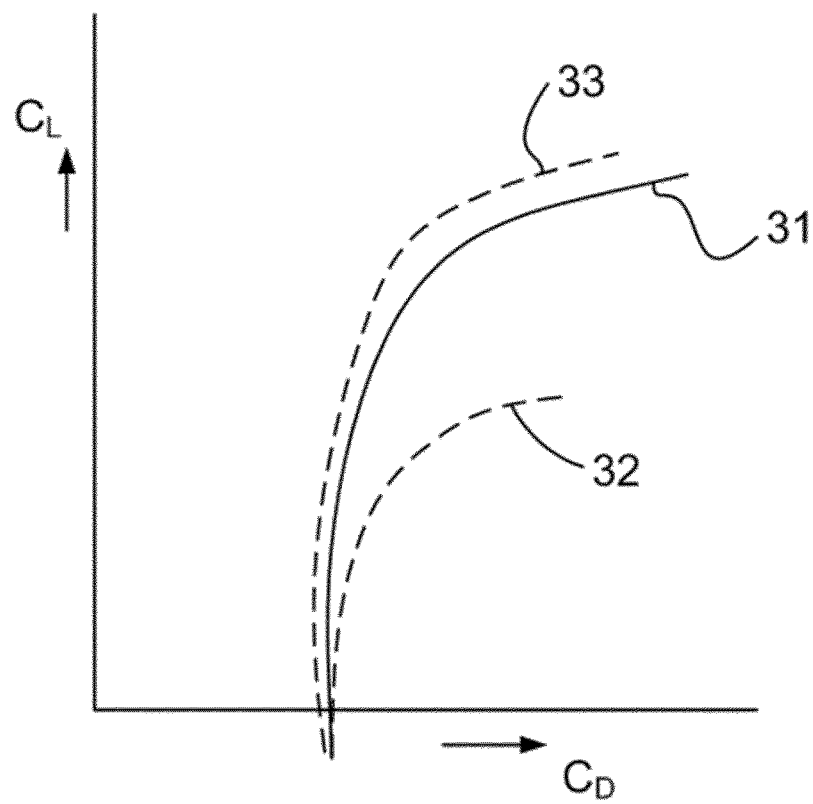

FIGS. 2a-2c illustrate the effect of a flap on the lift coefficient and drag coefficient of an aerodynamic profile for different angles of attack and different flap positions. FIG. 2a illustrates a profile 10 comprising a flap in three different positions: a neutral position 11, a positive position 12 (in which the flap has a positive contribution to the lift) and a negative position 13 (in which the flap has a negative contribution to the lift).

FIG. 2b illustrates a typical curve 21 of the lift coefficient of a profile vs. angle of attack. The angle of attack a has been illustrated in FIG. 2a and may be defined as the angle between a reference line on a lifting body (in this case, the chord line of an airfoil 28) and the vector 29 representing the relative motion between the blade and the air through which it is moving. In the case of a wind turbine, the vector representing the relative motion between the blade and the air may be composed of two components: the wind velocity $v_w$ and the rotational velocity of the local portion of the blade $v_r$. The rotational velocity of the local portion of the blade may be expressed as $$v_r = 2\pi \cdot r \cdot \frac{n}{60},$$

wherein r is the radius of the local portion of the blade and n is the number of revolutions per minute. The total wind velocity experienced by the blade portion may thus be expressed as $v=\sqrt{v_r^2+v_w^2}$, and the angle of attack may be determined in accordance with:

$$\tan \alpha = v_w/v_r$$

The angle of attack of a portion of the blade may thus be affected by the prevailing wind speed, the rotational speed of the rotor, its position along the blade span, the design twist of the airfoil and the pitch angle of the blade.

The typical curve 21 shows that with increasing angle of attack, the lift coefficient of the profile increases, until "stall". If the angle of attack is increased further, the lift coefficient is reduced.

If a flap is put in its positive position, the lift of the airfoil is increased. A curve 22 that is substantially parallel to curve 21 may be the result: for any angle of attack, the lift coefficient is slightly higher. Similarly, a curve 23 that is substantially parallel to curve 21 corresponds to the same profile, but with the flap in a negative position. It will be clear that in practice, the curves of the lift coefficient may be different for any profile employed on a blade.

FIG. 2c illustrates curves for the same three positions of the flap of the lift coefficient vs the drag coefficient. Curve 31 illustrates the profile with the flap in the neutral position, curve 32 illustrates the profile with the flap in the positive position and curve 33 illustrates the profile with the flap in the negative position. The $C_L$-$C_D$ curve may comprise a portion in which the drag hardly increases with increasing lift. The curve may also comprise a portion (closer to stall) along which the drag increases more rapidly than the lift.

The effect of the positive flap position is generally that the drag increases and the effect of a negative flap position is generally that the drag decreases.

It may be deducted from the illustrated curves that if loads are to be decreased, i.e. if high wind loads are imminent, one option is to reduce the angle of attack of a blade. This may be accomplished using a pitch mechanism. However, a disadvantage of the pitch mechanism is that it may be too slow to react to a prediction of a high load. Alternatively, the flap may be activated towards its negative position, so that the lift and drag may be reduced at the same angle of attack.

It will be clear that the lift curves ($C_L$ vs $\alpha$) and drag curves may vary if a different airfoil is used. Furthermore, it should be noted that three-dimensional aspects may affect the lift and drag curves of a blade as well. These three-dimensional aspects are herein ignored, since the general teaching (flap towards a positive position increases the lift, and flap towards a negative position decreases the lift, representing a jump to a different lift curve) will approximately hold true for a blade as well.

Figure 3:
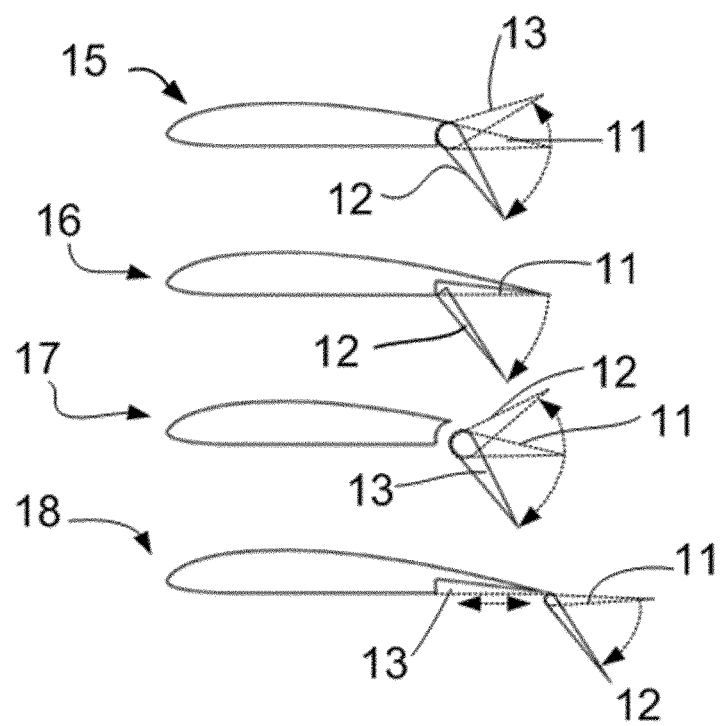
FIG. 3 illustrates various flap mechanisms that may be used in embodiments of the present invention.

FIG. 3 illustrates some of the different flaps that may be used in embodiments of the present invention. Profile 15 comprises a "plain flap" illustrated in its neutral position 11, its positive position 12, and its negative position 13. Profile 16 illustrates a "split flap" in its neutral position, and its positive position. Such a split flap does not have a negative position.

Profile 17 comprises a "slotted flap" in its neutral position 11, positive position 12 and negative position 13. With a slotted flap, the air may flow partially through the slot in between the flap and the remainder of the profile. Finally, profile 18 comprises a "Fowler flap" in its neutral position, its positive position 12 and its negative position 13. A peculiar property of the Fowler flap is that the chord of the profile in its neutral position is longer than in its negative position.

Other movable trailing edge surfaces than the ones illustrated may be used in embodiments of the present invention.

For example, also a Continuously Deformable Trailing Edge (CDTE) may also be used. In some embodiments, a blade may comprise one or more portions that are continuously deformable along its span.

Depending on which kind of flap or movable surface is used, the influence on the curves of the lift coefficient and drag coefficient may vary. In general, actuating the flap towards its positive position increases the curvature of an airfoil, which increases the lift. It further increases the drag, but to a lesser extent. As such, the loads on a blade increase, but this may be acceptable, in accordance with circumstances. The increase of the lift increases the aerodynamic torque of the rotor.

Actuating a flap towards its negative position decreases the lift and may increase the drag, but generally not to the same extent. The extent to which the drag increases (and it may actually decrease) also depends on the angle of attack. The decrease in lift reduces the aerodynamic torque and the loads on the blade in general. Moving the flap to its negative position may thus be used to counteract e.g. temporary high loads on a blade.

Figure 4:
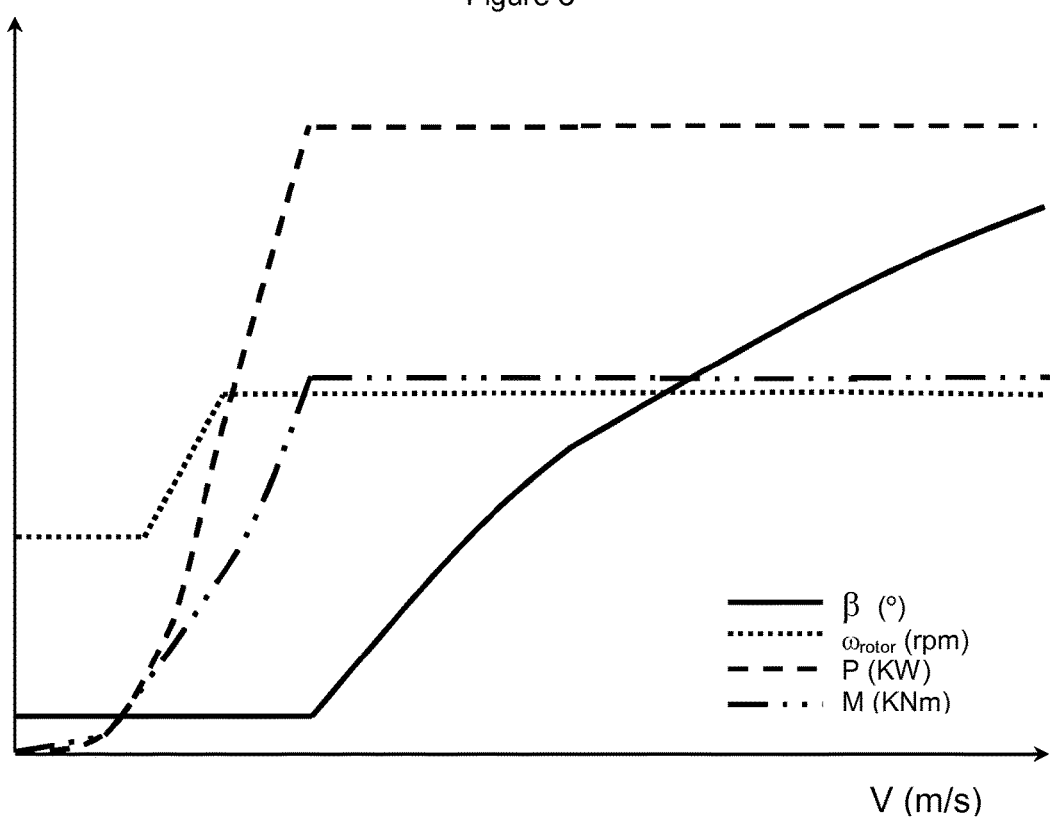
FIG. 4 illustrates a typical power curve for a variable speed wind turbine.

FIG. 4 illustrates a prior art control method and shows respectively the pitch angle ($\beta$), rotor speed ($\omega_{rotor}$), electrical power (P) and aerodynamic torque (M) at varying wind speeds.

As previously described, the pitch angle is generally not changed until nominal wind speed is reached, e.g. at 11 m/s. At a slightly lower wind speed, e.g. around 8.5 m/s, nominal rotor speed may be reached. At wind speeds above nominal wind speed, the pitch angle may be varied such as to maintain the aerodynamic torque substantially constant. The rotor speed, generator torque and electrical power generated may also be maintained substantially constant. This may be maintained from nominal wind speed to cut-out wind speed.

The pitch mechanism is particularly suitable for adapting the wind turbine blade to a varying wind speed. However, the pitch mechanism may not be suitable to react to a sudden wind gust. Actuation of the pitch mechanism in these circumstances may be too slow.

Further, individual pitching may be used to compensate e.g. for wind shear, illustrated in FIG. 1c. A blade that passes along the bottom of the swept area 4 will experience lower lift, then a blade that passes along a top portion of the swept area. The angle of attack of the blades may be varied along each cycle of rotation to adapt to changing wind speed.

Figure 5A:
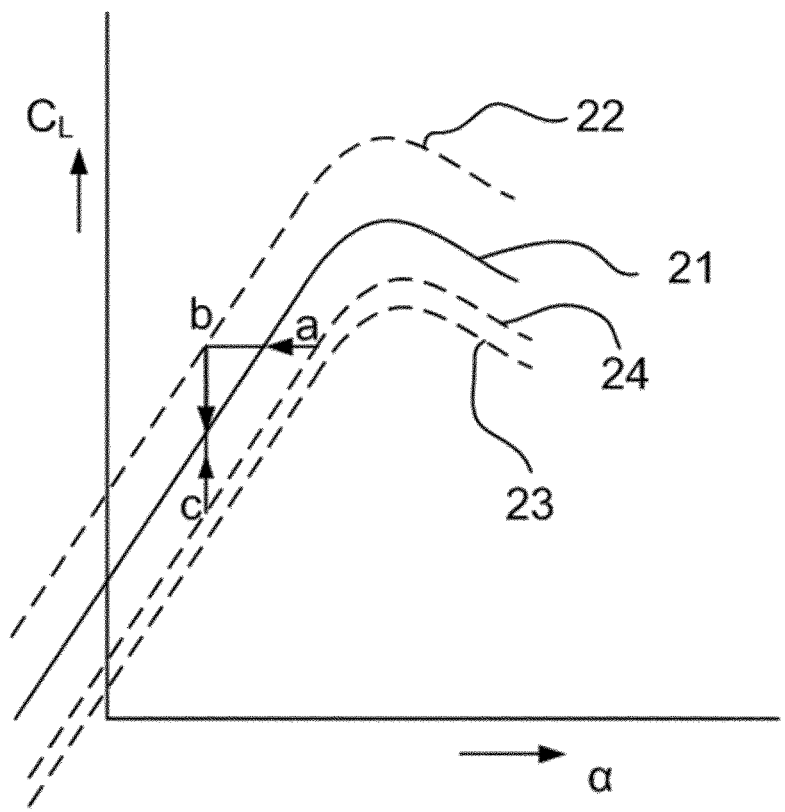
FIGS. 5a-5c and 5e illustrate various methods of operating a wind turbine according to different embodiments of the present invention.

FIGS. 5a-5c and 5e illustrate various methods of operation in accordance with the present invention. In FIG. 5a, the previously shown lift curves 21, 22, and 23 of a typical airfoil are shown. At a first moment in time, "a", the actual situation of the blade may be that the flap is in a negative position, on curve 24, but not in its most negative position. At this moment, high loads may be predicted for a second moment in time. This may be done e.g. using a LIDAR system. Alternatively, it may be that a high load is predicted e.g. because a neighbouring wind turbine has experienced such a high load. Any other alternative method for predicting loads may also be used, such as e.g. methods involving artificial neural networks or methods involving deterministic algorithms.

In order to prepare for such a high load, the flap may be moved towards its most positive position, so that a wide range of control is available for the flap when the high load occurs. If the flap were only moved towards its most positive position, the lift of the blade would increase and the total loads as well. To counteract this phenomenon, at the same time, the blade may be pitched such that the total lift (and the total loads) remains substantially constant, point "b". It may be deduced from FIG. 5a that at point "b", compared to point "a", the angle of attack is reduced and the lift is maintained substantially constant. An effect of this is that when the high load occurs, the flap may be moved quickly towards its most negative position, point "c", so as to reduce the loads. When the high load has passed, the flap may be returned towards its most positive position to regain the lift of the blade and the aerodynamic torque of the rotor.

With the move form point "a" to point "b" in FIG. 5a, the lift is maintained substantially constant. The aerodynamic torque of the rotor as well, and therewith the electrical power that may be generated. The operation of the wind turbine may thus be substantially unaffected by the manoeuvres in anticipation of a high load.

Figure 5B:
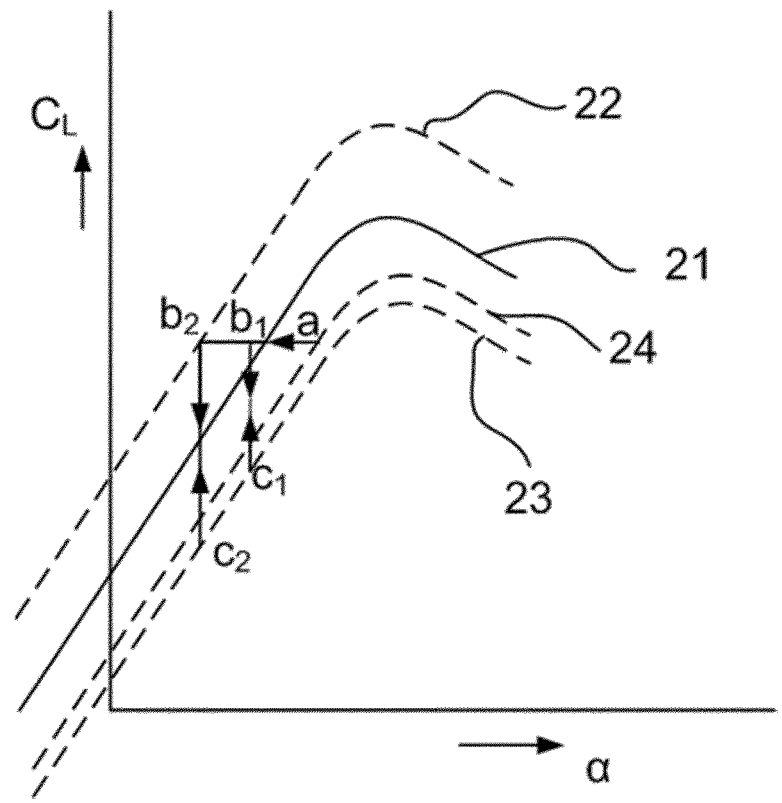

FIG. 5b illustrates another similar method. At a first moment in time, point "a", a high load may be predicted for a first blade at a second moment in time, and a high load may be predicted for a second blade at a third moment in time. In preparation of the high loads, the flap of the first blade may be moved towards a more positive position in accordance with FIG. 5a. At the same time, the blade may be pitched to compensate for this change. However, there may only be little time available before the high load will occur for the first blade. So, at point b1, when the high load occurs, the flap is quickly moved towards point c1.

However, for the second blade, there may be more time available before a high load occurs. This may be the case e.g. for a local turbulence 7, as illustrated in FIG. 1a. With a clockwise rotation, blade 3 will experience the high load before blade 2. The local turbulence may have disappeared before blade 1 could experience the turbulence.

Figure 5C:
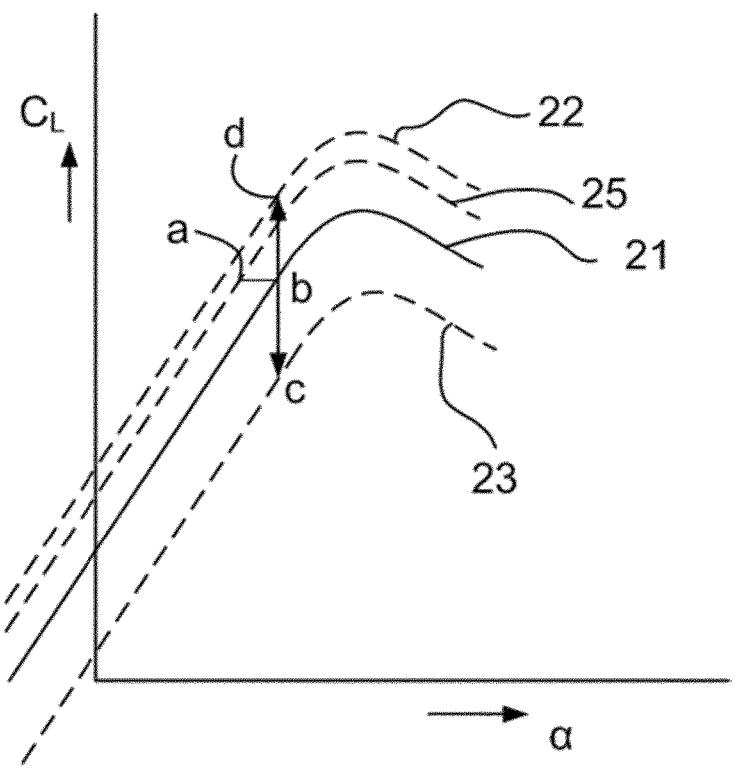

FIG. 5c illustrates another method of operating a wind turbine. At a first moment in time, the blade may be in a configuration corresponding to point a. The flap may be in a substantially positive position. If a wind gust is predicted at this point in time, contrary to what was shown before, the flap may be moved towards its neutral position. At the same time, the blade may be pitched so as to increase the angle of attack.

Figure 5D:
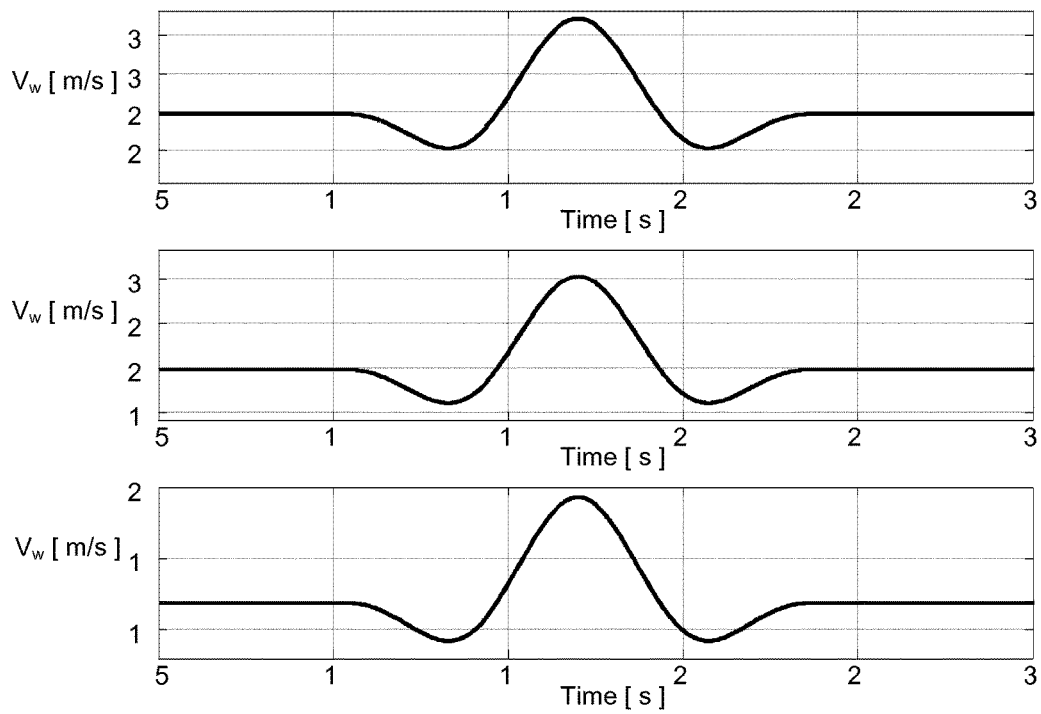
FIG. 5d illustrates a plurality of "Mexican hat" wind gusts.

When the wind gust occurs, the blade will thus be in a configuration in which it has a wider operational range to react to the wind gust. In case of e.g. a Mexican hat wind gust, illustrated in FIG. 5d, the wind speed first decreases below the original wind speed, then quickly increases, then decreases again below the original speed, to finally stabilize again. The flap may thus be moved between points "c" and "d" to adapt to the varying wind speed during the wind gust.

Figure 5E:
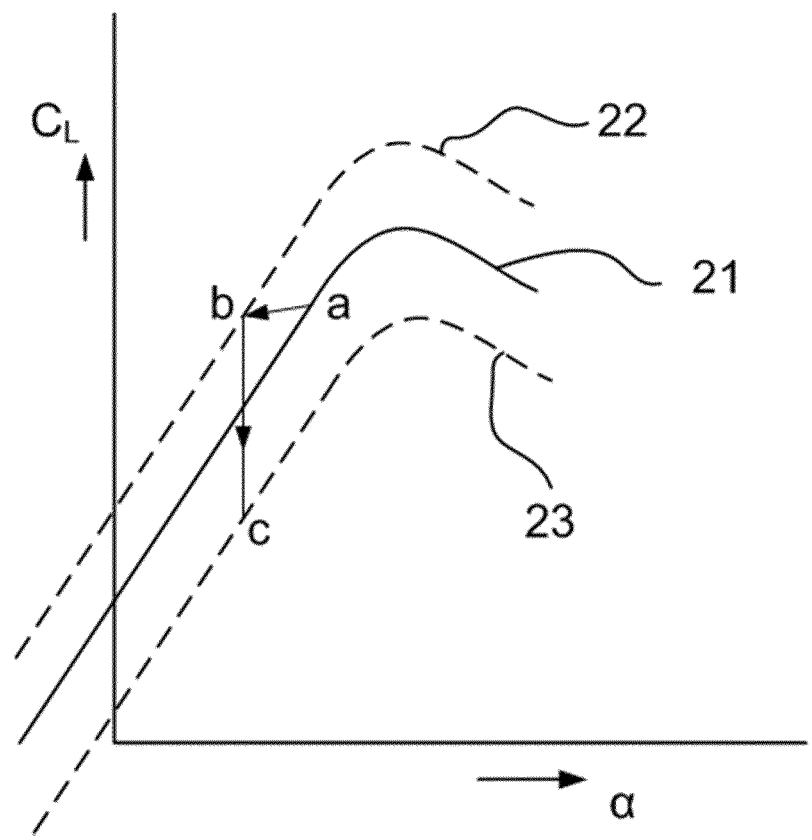

FIG. 5e illustrates another method. In the methods illustrated so far, between the moment of predicting a load, and the moment of the load actually occurring, it was attempted to substantially maintain the lift constant. A constant lift means that the torque generated by the blade is substantially constant as well. The electrical power may thus be maintained at the same level as well. Depending on the particular situation however, the drag may increase, and the total loads as well.

In the method illustrated in FIG. 5e, the lift is however slightly decreased between points "a" and "b". This may be acceptable under circumstances as well. An advantage is that the total loads may be kept more constant, while at the same time the operational range of the flap to counteract an impending load is increased.

Criteria other than the generation of electrical power, or limit loads may be important during the operation of a wind turbine. For example, a wind turbine may be in a shutdown procedure when the high load is predicted. In this case, the flaps (or other movable surface) may be actuated upon so that they assume a position in which their range of control to counteract the high load is increased. At the same time, the blade(s) may be pitched such as to continue slowing down the wind turbine. In this case, the priority may not be to maximize the generation of electricity or the loads on the blades, but instead may be to continue reducing the speed of the wind turbine.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine comprising a plurality of blades, each of the blades being rotatable along its longitudinal axis using a pitch mechanism, and each of the blades comprising one or more movable trailing edge surfaces, the method comprising:
   at a first moment in time predicting that a first of the blades will experience a high load at a later second moment in time,
   before the second moment in time, actuating one or more of the movable trailing edge surfaces of the first blade such that the trailing edge surfaces of the first blade are moved from an initial position to a modified position that will provide a wider range of control to counteract the first high load at the second moment in time, and simultaneously pitching the first blade to a position to at least partially compensate for lift changes induced in the first blade by movement of the trailing edge surfaces to the modified position, and
   at the second moment in time, actuating the one or more movable trailing edge surfaces of the first blade from the modified position to a final position to counteract the first high load.

2. The method according to claim 1, wherein the pitching the first blade comprises pitching the first blade to a position such that a generation of electrical power by the wind turbine is not negatively affected by the modified position of the trailing edge surfaces.

3. The method according to claim 1, wherein the pitching the first blade comprises pitching the first blade to a position such that loads on the first blade remain substantially at the same level as at the first moment in time with the trailing edge surfaces at them modified position.

4. The method according to claim 1, wherein the predicting a high load for the first blade comprises using a LIDAR.

5. The method according to claim 1, wherein the predicting a high load for the first blade comprises measuring loads in the wind turbine.

6. The method according to claim 1, wherein the trailing edge surfaces of each of the blades comprises one or more flaps.

7. The method according to claim 6, wherein each of the blades comprises a plurality of the flaps distributed along the length of the blade, and wherein each of these flaps is adapted to be actuated individually.

8. The method according to claim 1,
   wherein one or more of the movable trailing edge surfaces of the first blade are moved substantially towards their most negative position at the modified position, in which the lift of the first blade is most reduced, and the first blade is pitched such as to increase its angle of attack.

9. The method according to claim 1, wherein the wind turbine comprises an individual pitch system for each of the blades, such that each of the blades can be pitched individually.

10. The method according to claim 1, wherein the predicting a high load for a first blade at a second moment comprises measuring loads in another wind turbine.

11. The method according to claim 1, wherein one or more of the movable trailing edge surfaces of the first blade are moved substantially towards their most positive position at the modified position, in which the lift of the first blade is most increased, and pitching the first blade such as to decrease its angle of attack.

12. A method of operating a wind turbine comprising a plurality of blades, each of the blades being rotatable along its longitudinal axis using a pitch mechanism, and each of the blades comprising one or more movable trailing edge surfaces, the method comprising:

at a first moment in time predicting that a first blade will experience a first high load at a second later moment in time, and predicting that a second blade will experience a second high load at a third moment time later than the second moment in time, before the second moment in time, actuating on one or more of the movable trailing edge surfaces of the first blade from an initial position such that they assume a modified position that will provide a wider range of control to counteract the first blade high load at the second moment in time, before the third moment in time, actuating on one or more of the movable trailing edge surfaces of the second blade from an initial position such that they assume a modified position that will provide a wider range of control to counteract the second blade high load at the third moment in time, before the second moment in time, pitching the first and second blades of the wind turbine to a respective position to at least partially compensate for lift changes induced in the first and second blades by movement of the respective trailing edge surfaces to the modified position, at the second moment in time, actuating the one or more movable trailing edge surfaces of the first blade from the modified position to a final position to counteract the first blade high load, and at the third moment in time, actuating the one or more movable trailing edge surfaces of the second blade from the modified position to a final position to counteract the second blade high load.

13. The method according to claim 12, comprising pitching the first and second blades to a position such that a generation of electrical power by the wind turbine is substantially not negatively affected by the modified position of the respective trailing edge surfaces.

14. The method according to claim 12, comprising pitching the first blade to position such that loads on the first blade remain substantially at the same level as at the first moment in time with the respective trailing edge surfaces at the modified position, and pitching the second blade to a position such that loads on the second blade remain substantially at the same level as at the first moment in time with the respective trailing edge surfaces at the modified position.

15. The method according to claim 14, wherein one or more of the movable trailing edge surfaces of the first blade are moved towards a substantially neutral position at the modified position.

16. The method according to claim 15, wherein the first blade is pitched such as to increase the angle of attack of the first blade.

17. The method according to claim 15, wherein pitching the first blade is pitched such as to decrease the angle of attack of the first blade.

18. The method according to claim 14, wherein the predicting a first high load for a first blade at a second moment in time, and the predicting a second high load for a second blade at a third moment in time comprises predicting the same high load for the first and second blades.

19. The method according to claim 14, wherein the predicting a high load for a first blade at a second moment in time, and the predicting a high load for a second blade at a third moment time comprises measuring loads in the wind turbine.

* * * * *